Figure 1:
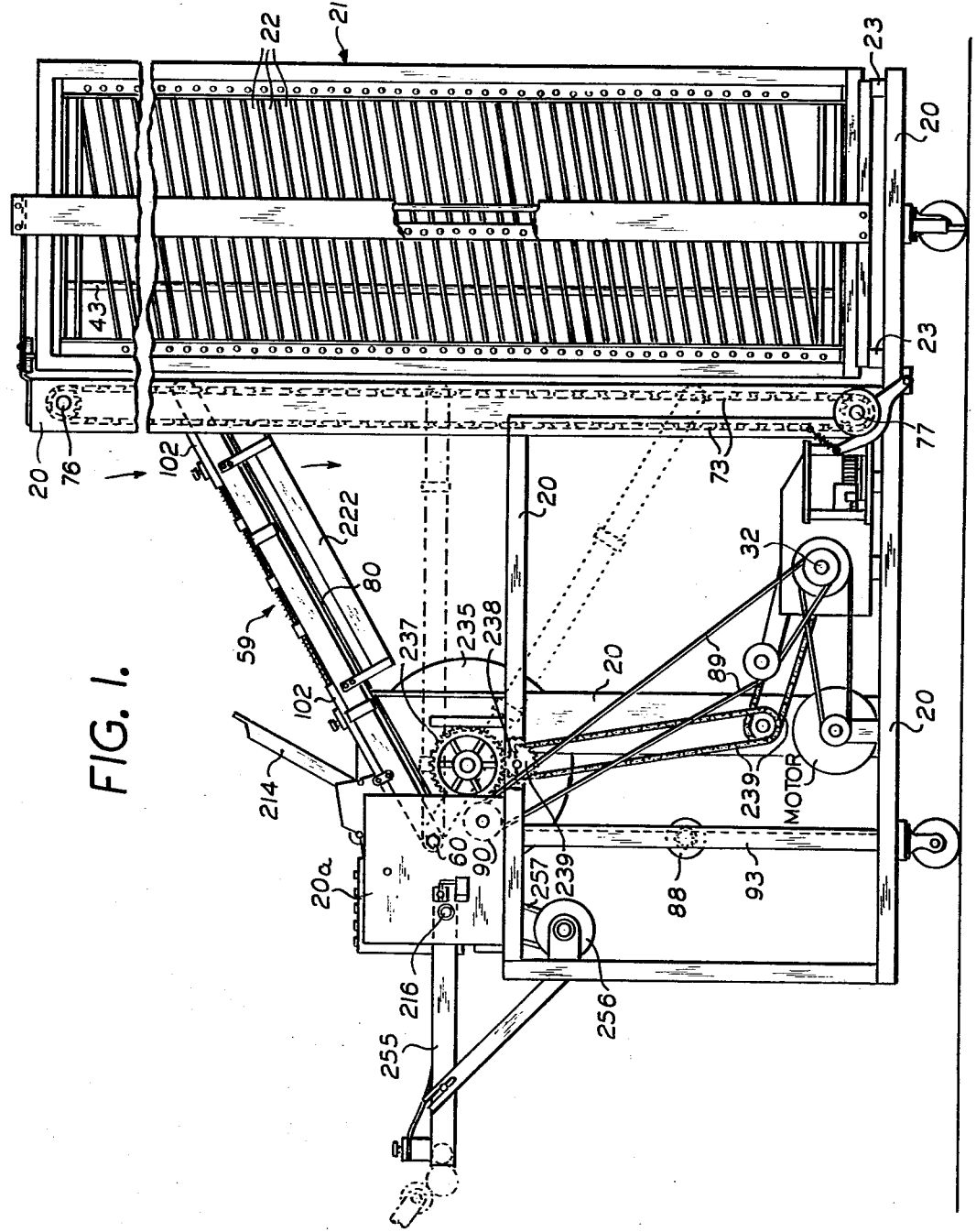

Dec. 5, 1967   L. MESTRE   3,356,362
SHEET SORTER HAVING PIVOTED RAMP
Filed Oct. 20, 1965   10 Sheets-Sheet 1

INVENTOR
LUIS MESTRE
BY
John M. Montstream
ATTORNEY.

Dec. 5, 1967 L. MESTRE 3,356,362
SHEET SORTER HAVING PIVOTED RAMP
Filed Oct. 20, 1965 10 Sheets-Sheet 2

INVENTOR
LUIS MESTRE
BY
John M. Montstream
ATTORNEY.

Dec. 5, 1967     L. MESTRE     3,356,362
SHEET SORTER HAVING PIVOTED RAMP

Filed Oct. 20, 1965     10 Sheets-Sheet 3

INVENTOR
LUIS MESTRE
BY
*John M. Montstream*
ATTORNEY.

Dec. 5, 1967   L. MESTRE   3,356,362
SHEET SORTER HAVING PIVOTED RAMP
Filed Oct. 20, 1965   10 Sheets-Sheet 4
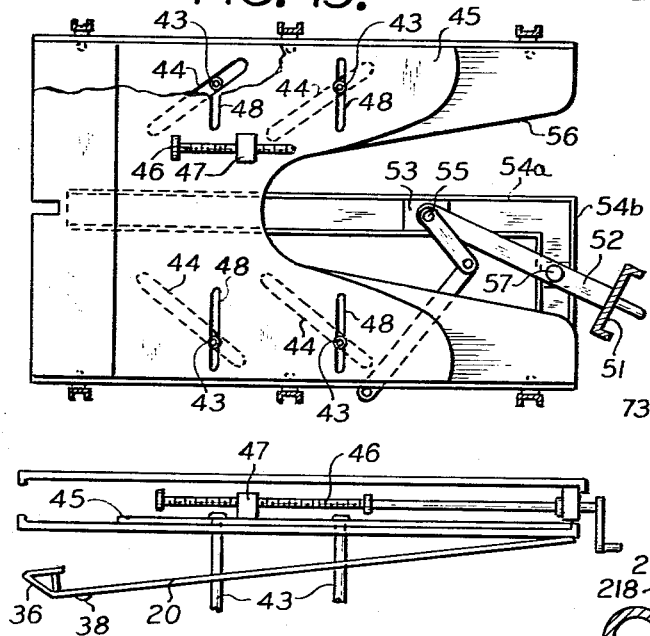
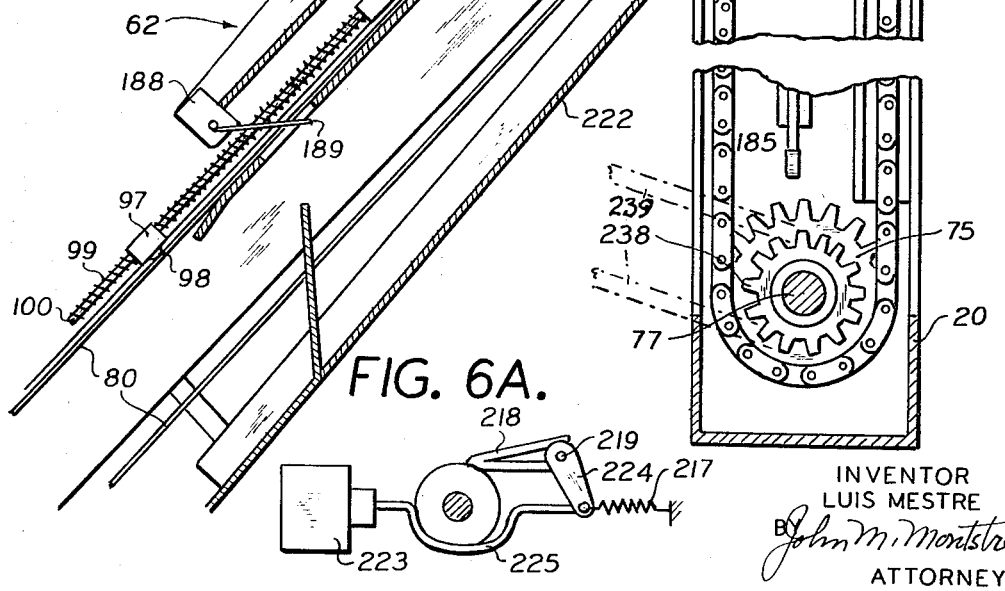
INVENTOR
LUIS MESTRE
BY John M. Montstream
ATTORNEY.

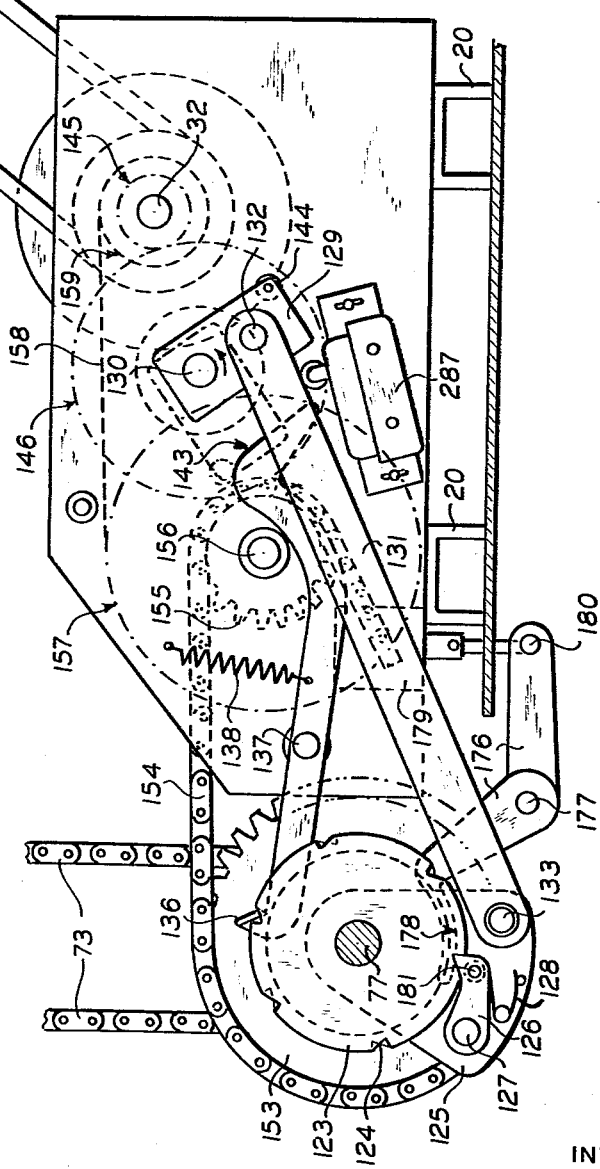

Dec. 5, 1967  L. MESTRE  3,356,362
SHEET SORTER HAVING PIVOTED RAMP
Filed Oct. 20, 1965  10 Sheets-Sheet 6

INVENTOR
LUIS MESTRE
BY
John M. Montstream
ATTORNEY.

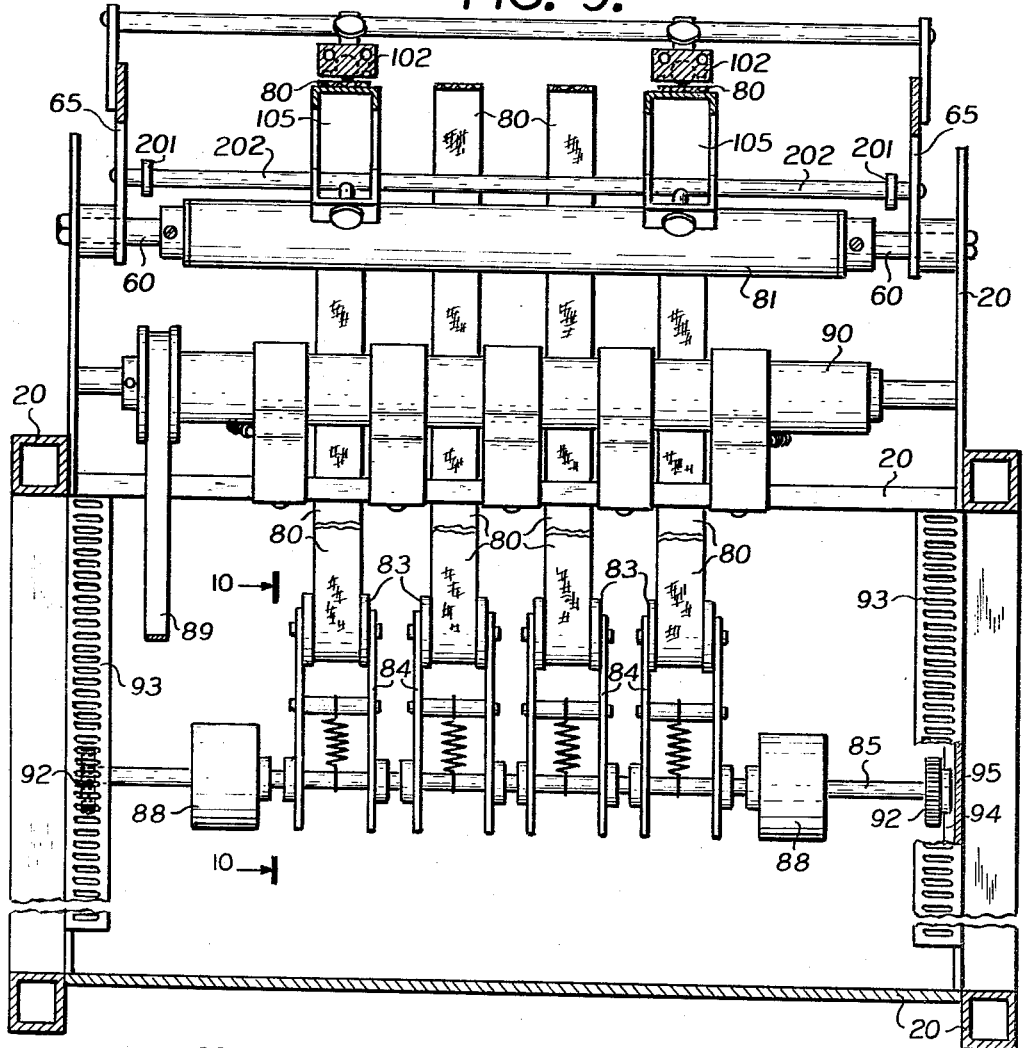
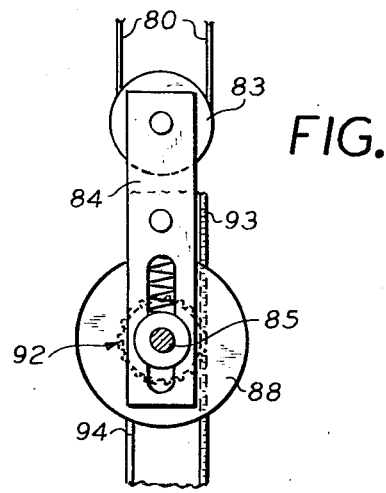
FIG. 9.
FIG. 10.
INVENTOR
LUIS MESTRE

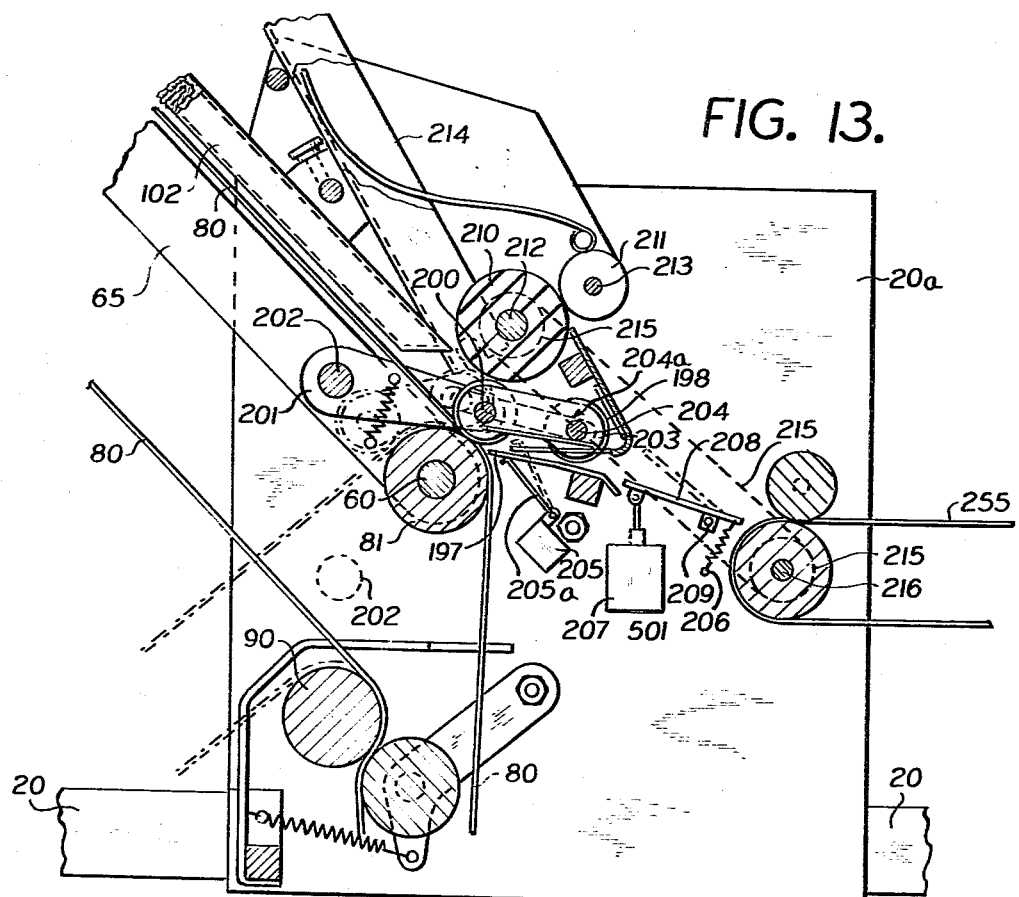
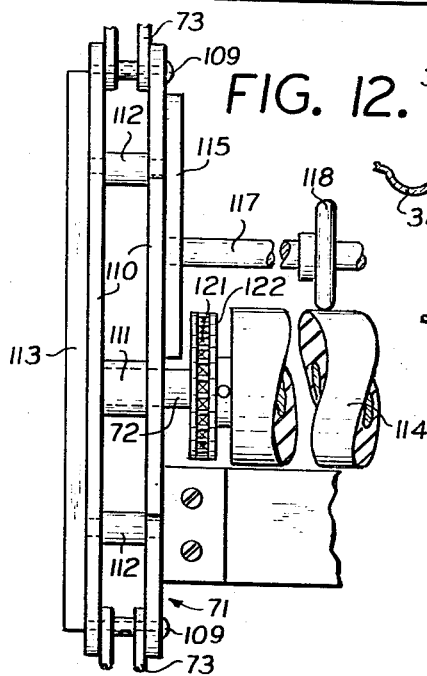
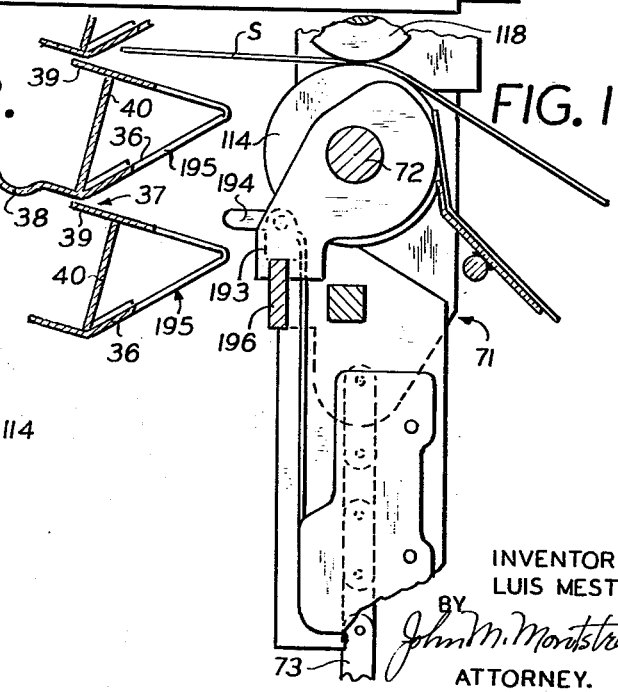

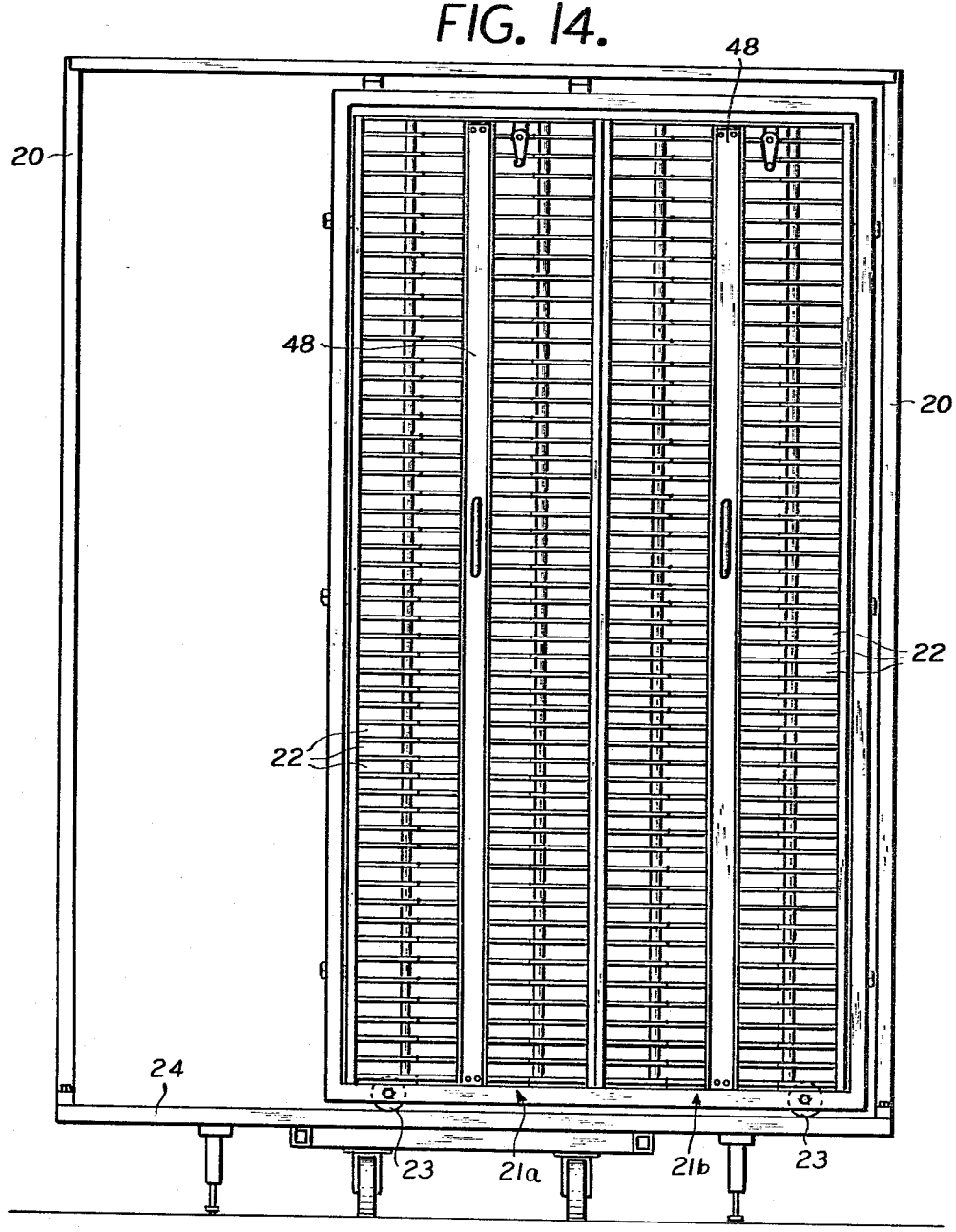

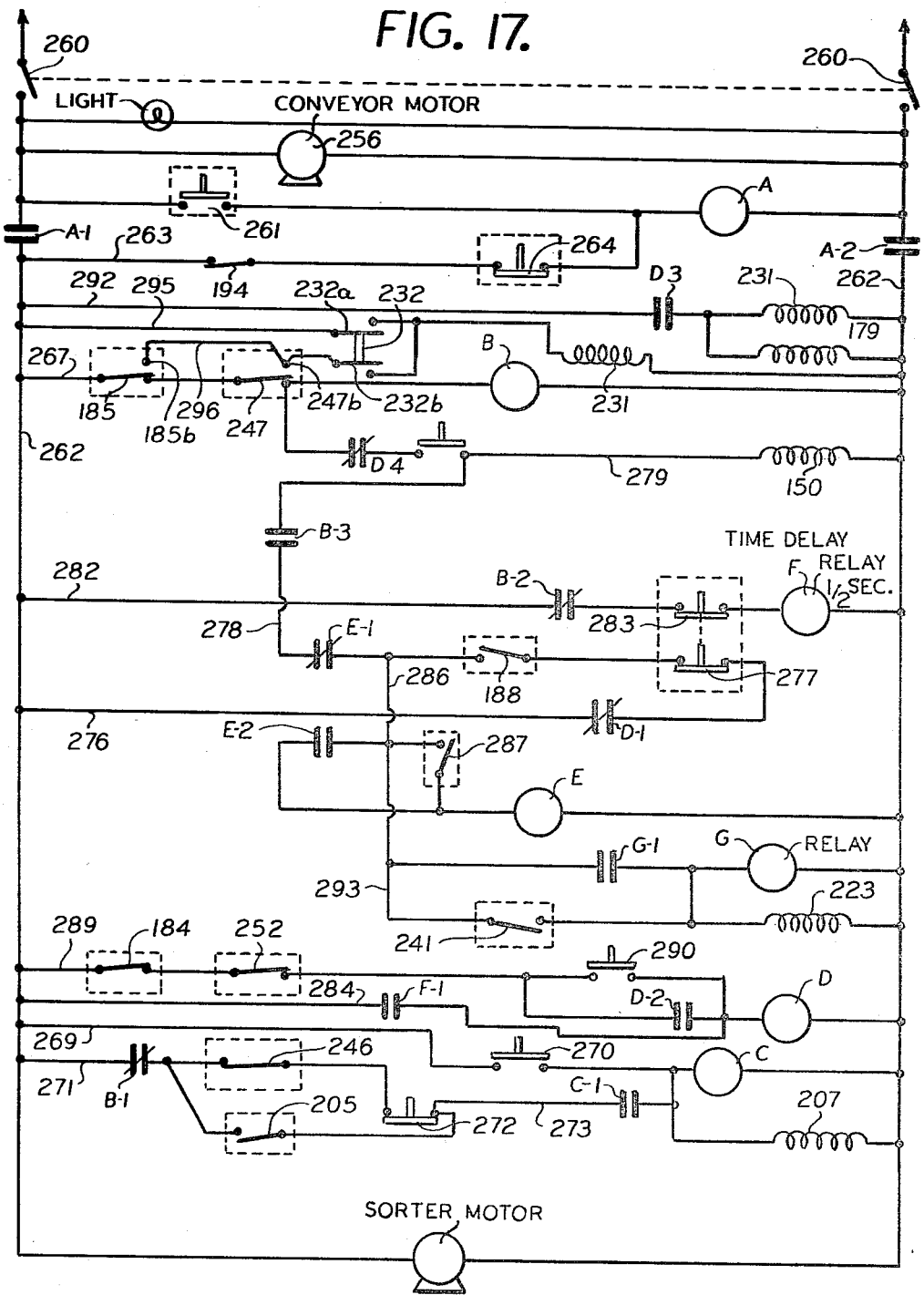

United States Patent Office 3,356,362
Patented Dec. 5, 1967

3,356,362
SHEET SORTER HAVING PIVOTED RAMP
Luis Mestre, 305 E. 46th St., New York, N.Y. 10017
Filed Oct. 20, 1965, Ser. No. 498,744
30 Claims. (Cl. 270—58)

The invention relates to a sheet sorter for primarily delivering one sheet to each of a plurality of pockets. It has particular application in the printing of booklets or books in small quantities. In this application, the sorter is spaced on the delivery side of a printing press and as each sheet is printed, one sheet is delivered to a plurality of pockets which may be to each of the pockets. The press has the plate for page 2 inserted therein and the second sheet is delivered by the sorter to a plurality of pockets which may be to each pocket and so on for all the pages of the book. The sorter herein provides a plurality of pockets such as fifty in vertical stacked relation and the sheets are delivered successively to each pocket by a pivoted ramp, the delivery end of which is shifted successively opposite each pocket. There are various controls for accomplishing this delivery of a sheet to the pockets as well as various selective controls for rejecting a sheet so that any one or more pockets backs one or more of the sheets.

It is an object of the invention to construct a sorter using a pivotal ramp means to feed generally a sheet in succession to each of a stack of vertically aligned pockets.

Another object is to construct a sorter with a pivotal ramp means which expands and contracts so that the stack of pockets may be in vertical alignment.

Another object is to construct a sorter which can be programmed to not feed a sheet to any one or more of the pockets in the stack.

Another object is to construct a sorter with a pivotal ramp means for feeding a sheet into each of a plurality of vertically stacked pockets with safety means which stops the machine in the event that a sheet has failed to satisfactorily enter the pocket.

A further object is as in the preceding paragraph in which the safety control is carried at the delivery end of the ramp means.

A further object is to provide a sorter in which control means is provided to set the number of pockets which are to receive a sheet which is adjustable as to the extent of movement of the ramp means and also adjustable to fix a zone of pockets into which the sheets are delivered.

Figure 2:
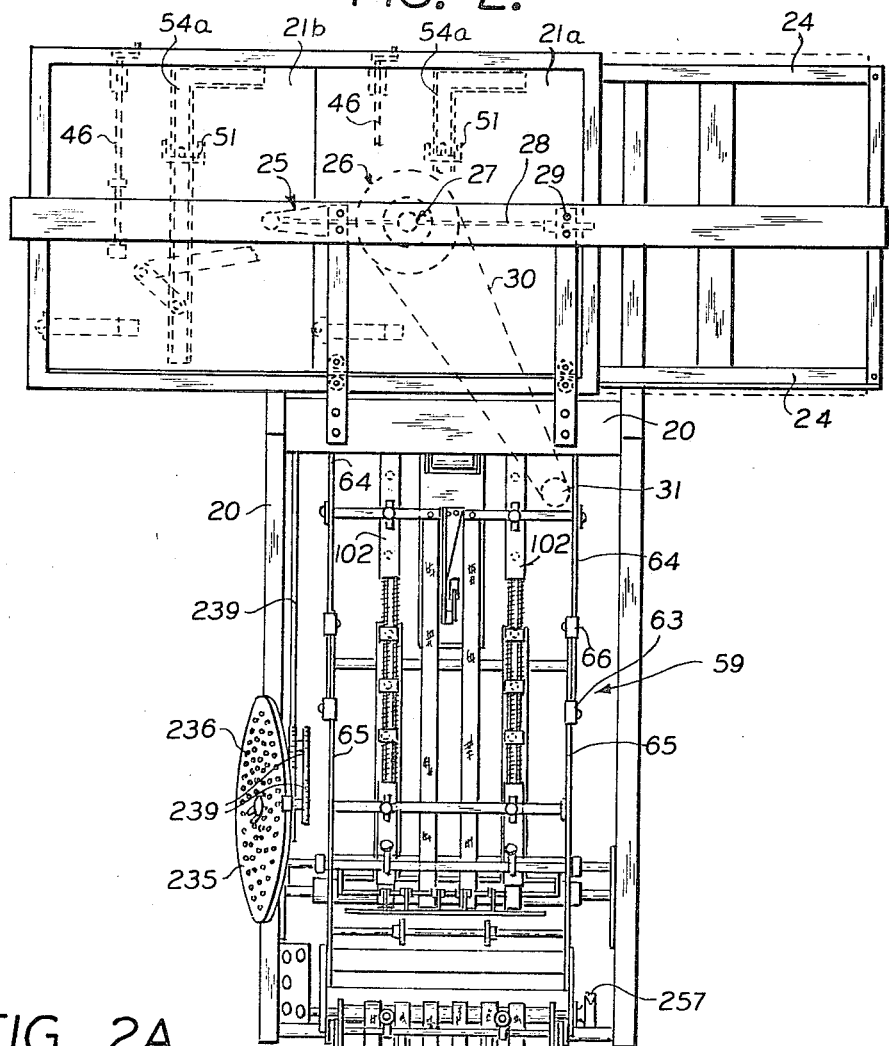
Figure 2A:
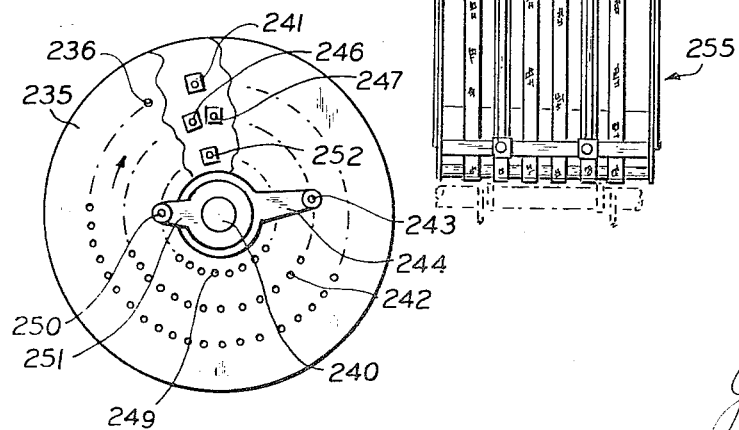
Figure 8:
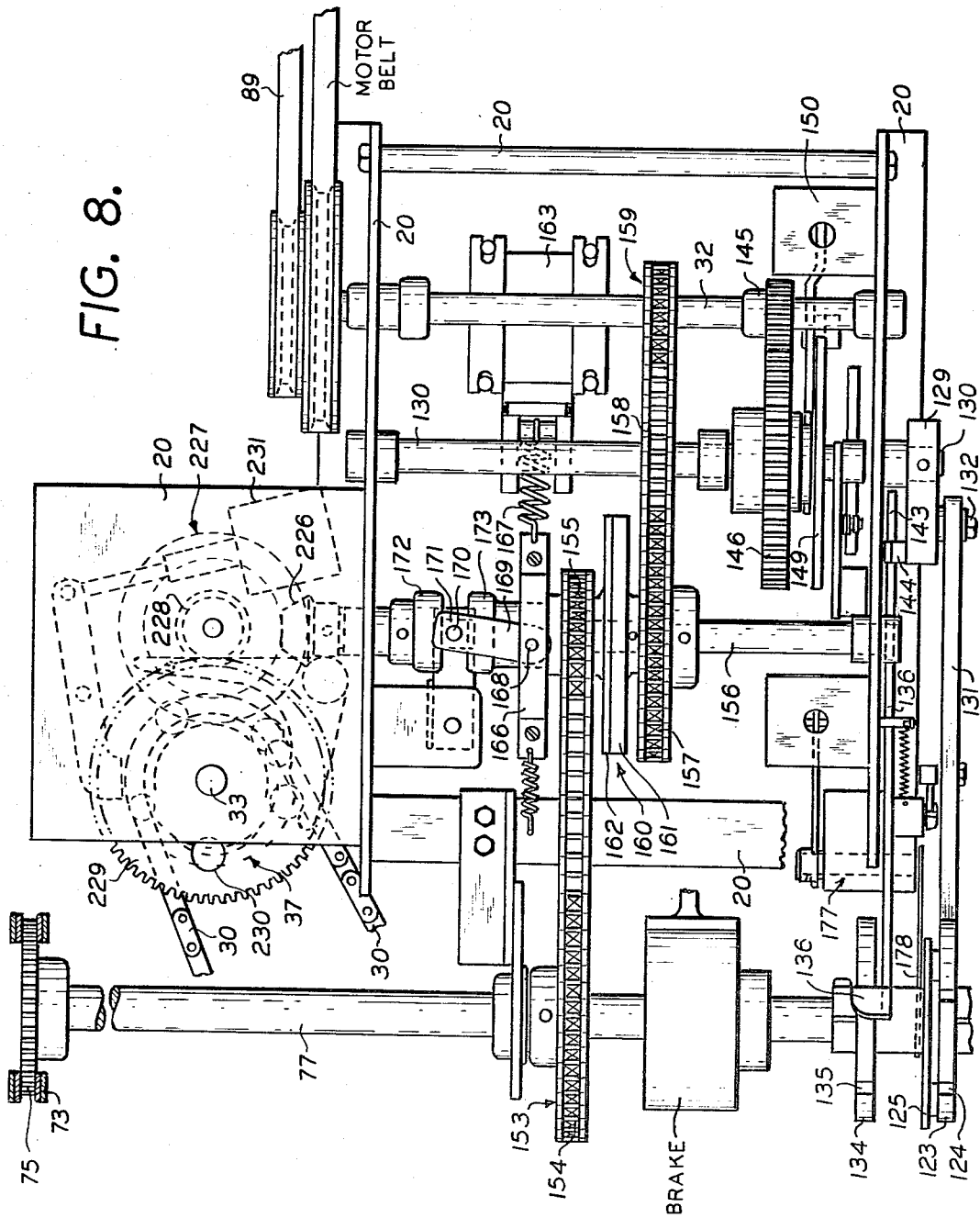

Other objects of the invention will be more apparent from the following description when taken in connection with the accompanying drawings illustrating a preferred embodiment thereof in which:

FIG. 1 is a side view of the sorter;
FIG. 2 is a top view of the sorter;
FIG. 2A is a detail view of the programmer;
FIG. 3 is a plan view of the ramp means;
FIG. 4 is an enlarged cross section taken on line 4—4 of FIG. 3;
FIG. 5 is an enlarged partial longitudinal section taken on line 5—5 of FIG. 3;
FIG. 6 is an enlarged view of the delivery end of the ramp means and its raising and lowering means;
FIG. 6A shows the solenoid connection to the rear deflector,
FIG. 7 is a side view of the ramp operating means;
FIG. 8 is a top view of the ramp operating means;
FIGS. 9 and 10 show details of the ramp endless means;
FIGS. 11 and 12 show details of the delivery end of the ramp means;
FIG. 13 is a view of details of the delivery end of the ramp means;
FIG. 14 shows a double pocket stack means;

FIGS. 15 and 16 show details of the stack means; and
FIG. 17 is a circuit diagram.

The sorter includes a frame 20 of suitable form. A pocket stack means 21 having a plurality of pockets is provided which may be fixed to the frame. When the number of the pockets desired becomes large, it is inconvenient to have the height of the pockets to extend much more than over six feet so that fifty pockets for each of the plurality of vertical stacks is a convenient number for each stack of pockets. If the number of pockets provided are to be, for example, one hundred, the capacity of the sorter is increased to fit such situations as when it is desired to have more than fifty of the booklets, books, or the like.

The sorter illustrated is provided with one hundred pockets by having the stack means comprise two stacks 21a, and 21b, of fifty pockets each, adjacent and fixed to each other with the pockets of each stack in vertical arrangement. When one stack of pockets is filled, or any desired portion thereof, the second stack is moved into receiving position and the desired number of pages are delivered into the pockets of the second stack.

The stack means unit could be moved by hand to and from sheet receiving position, however, power means is preferably provided to shift the stack to and from receiving position when the proper number of sheets has been placed in a desired number of pockets in the receiving stack. This can be accomplished in several ways, that illustrated mounts the stack unit on wheels 23, FIG. 14, which engage a stack track 24 positioned adjacent to or on to the floor. A bell crank lever 25 secured to a sprocket or wheel 26 rotatably mounted on the frame on a pivot or shaft 27. The bell crank lever is connected through a link 28 to a pivot 29 carried by the bottom of the stack. The bell crank lever is rotated by suitable means, that shown being a chain 30 connected with a sprocket or wheel 31 on a shaft 33 driven by the shaft 156, FIG. 8, as will be described hereinafter. In addition, the power stack shifting means may be automatic as will appear.

Each pocket 22, FIG. 6, has an angular director 36 projecting upwardly from the bottom of the pocket at the receiving end of the pocket which directs the sheet through a narrow slot 37 at the top of the pocket through which the sheet is projected into its pocket. The bottom of each pocket has projections 38 directed downwardly adjacent to the slot to direct a sheet entering the pocket downwardly into the pocket. The projections extend below the slot so that it also obstructs rebound of the sheet back into the slot. In addition, a lip 39 projects inwardly beyond the end 40 of the pocket so that the end of the sheet is trapped from re-entry into the slot on any rebound.

Each stack of pockets has side means, FIG. 15, shown as two pairs of spaced vertical side bars 43 each extending through an angular slot 44 in the bottom or shelf of each pocket. These vertical side bars are carried by a slide plate 45 in lateral slots 48 in which they are movably adjusted laterally and forwardly so that they may be suitable for the width of the sheet fed into the pocket. The slots 44 are spaced at their widest nearer the back of the stack of pockets and narrows forwardly so that the bars move inwardly when shifted forwardly for narrower sheets which are usually shorter sheets. It is the joint action of slots 43 and 48 which adjusts the positions of the side bars. The bars are adjusted by a screw 46 connected with a nut 47 which in turn is secured to the slide plate 45 to move the later forwardly and rearwardly.

Each stack is also provided with an adjustable back stop means for the sheets which includes a rear bar 51 secured to arms 52 at top and bottom which are pivotally mounted on a back stop carrier 53 slidably mounted in channels 54a and 54b at right angles thereto forming rails at the top and bottom of each stack. Each rear stop bar is adjustable forwardly and rearwardly with their carriers which are slidably mounted in the channel. The rear stop arm is pivotally mounted on a pivot 55 and carries a guide 57 so that by pulling the stop bar rearwardly to a point where the guide 57 is opposite channel 54b whereupon the rear stop may be swung laterally out of the way which opens up the back of the pockets for removal of the sheets therefrom. The pockets have a cut out 56 to receive the back stop.

The sheets are delivered to the pockets by a ramp means 59 having an entry end at the printing press and a delivery end at the stack means. The entry end of the ramp means is mounted on the frame for pivotal movement such as on a pivot 60 which is carried by the frame at a point spaced from the stack means and is located at a level approximately that of the vertical center of the stack of pockets. The ramp means is constructed so that it extends and contracts longitudinally and is made up of an entry section 61 and a delivery section 62 which are operatively connected together for extension and contraction. When the delivery end of the ramp means is at the top or bottom of the stack of pockets, it is fully extended. As the delivery end moves downwardly from the top, the ramp means contracts until it reaches a midpoint after which it gradually extends and reaches maximum extension at or slightly beyond the bottom pocket. The delivery section of the ramp means is suitably connected with or mounted on the entry section for relative longitudinal movement thereon. The connection shown is by clip means 63 at the end of side members 64 which form the sides of the delivery section extend around the edges of side members 65 forming the sides of the entry section. Similarly the ends of side bars 65 have clip means 66 extending around the edges of the side members 64 to contact the outer face of the side members 64 of the entry section. The inner surfaces of the side members 64 of the delivery section of the ramp means slides along the outer surfaces of the side members 65 of the entry section. The side members 64 are secured together in spaced relation by a cross bar.

Means are provided, FIGS. 3 and 6 to extend and contract the ramp means as it pivots so that the delivery end of the ramp means is always uniformly spaced from the entry slot of each pocket. A convenient means for accomplishing this is a vertical track means 69, FIG. 4, carried by the frame and may be a part thereof. Preferably, too, the track is adjacent to the stack means.

The delivery end of the ramp means is provided with carriage means including a carriage 71, FIGS. 11 and 12, on each side of the ramp means. Each carriage is received by the track means and rides therein. Each carriage is connected with the delivery end of the ramp means by a shaft 72. Each carriage is also connected with chain means one chain 73 being on each side which chains are mounted on an upper sprocket 74 and a lower sprocket 75 rotatably mounted on the frame 20. The sprockets are carried or secured to shafts 76 and 77 respectively rotation of which drives the chain means and moves the carriage means and the delivery end of the ramp means.

The ramp means is provided with endless means to feed the sheets, delivered in succession to the ramp means at the entry end, along the ramp means and to deliver the sheets at the delivery end where they are projected into the pockets. The means shown constitute a plurality of endless means, shown as four belts 80, FIGS. 9 and 13, which pass over a roller 81 mounted on the ramp means pivot 60 at the entry end and pass over a roller 82 at the delivery end of the ramp means, that is, carried on the delivery end of the delivery section. Preferably, roller 82 is spaced from the end of the ramp means as will appear. Means are provided to keep these belts taut as well as to permit the belts to accommodate for the extension and contraction of the ramp means. To this end, a floating roller means, including rolls 83 are carried by a roll frame means 84 mounted on a free shaft 85 and each end of this shaft is freely movable vertically as the ramp means extends and contracts. A driving roller 90 is carried at the entry end of the ramp means over which the belts pass so that the two spans of the belt means are practically vertical as they pass over the floating roll means. The floating roll means, or its shaft, carries weights 88 to keep the belts taut. The endless belt means is driven in any suitable manner in that it could be a separate motor, however, it is economical to connect it to the main drive shaft 32, FIG. 1 such as through a belt 89 and a pulley connected with the belt driving roller 90. Gears 92 on the free shaft 85 each meshing with a rack means 93, assist in vertically guiding the free shaft 85, keeping it horizontal and the belts taut. A flange 94 on the rack means engages a collar 95 on the gear 92 to retain the gear in mesh with the rack.

The ramp means is provided with means which presses the sheet of paper moving along the ramp means in driving contact with the endless belt means so that the sheet moves therewith. This pressing means desirably expands and contracts with the extension and contraction of the ramp means. The construction shown includes a plurality of floating ball cages 97, FIGS. 3 to 5, each having a ball 98 resting in contact with a belt and each floating cage separated from its adjacent cages by spring means 99 around a rod 100. The rods are slidable through holes 101 in the ball cage. Each end of the pressing means has an elongated ball cage 102 secured to the ramp means by braces which cages retain additional balls 98 in spaced relation and also have holes 104 to slidably receive the ends of the rods 100 in one cage 102 and each rod is secured in a hole in the other cage. As the ramp means expands and contracts, each spring between ball cages expands and contracts and therefore keeps the floating cages and balls in uniformly spaced relation and in contact with the belt means. Two belts are shown as provided with pressing means and these belts are also provided with belt tracks or supports 105, FIG. 4, which are telescoping to accommodate for extension and contraction of the ramp means. The belt tracks and presser means may be used on the center belts rather than on the outer belts if desired. The ball cages rest on supports 106 secured to the lower elongated ball cage 102 and slidable in the upper cage 102.

The delivery end of the ramp means 59 is raised and lowered by ramp operating mechanism. This operating mechanism includes indexing means which moves the delivery end in step-by-step motion in one direction for the delivery of a sheet to each pocket and a return operating means which returns the delivery end of the ramp means in the other direction to the other or initial position of the movement. In the construction paricularly shown, the indexing means moves the delivery end in steps downwardly and the return operating means moves it upwardly as rapidly as the mass of the ramp means permits in one continuous movement. It is clear that the sorter will function equally well with the indexing means raising the delivery end of the ramp means so that sheets are fed to the respective pockets on the upward movement of the ramp means and the continuous return movement would be downwardly.

The ramp operating means, FIGS. 6, 11, and 12, includes the pair of spaced sprockets 74 and 75 rotatably mounted on each side of the frame and each chain 73 extending between the sprockets. A carriage 71 is attached to each chain by pins 109 and the carriages desirably are secured together by a brace. Each carriage includes a pair of spaced plates 110 which carries a bearing 111 in which the shaft 72 is mounted. Each carriage is guided by a track 69 formed with the uprights of the frame so that this track also constitutes means for extending and contracting the ramp means. The plates 110 are spaced apart by bushings 112. A wear plate 113 is secured to the outer surface of the outer plate 110. A delivery for auxiliary roller 114 is rotatable with the shaft 72 which roller is spaced from the upper belt roller 82. Each carriage also carries a directing roller mounting plate 115 having a vertical slot 116, FIG. 6 which receives a shaft 117 carrying a sheet directing roller 118 which engages the top periphery of roller 114 in all positions of the ramp. The slot is elongated to provide a rest notch 119 to retain the shaft of the directing roller away from roller 114 when desired. The roller 114, FIG. 12, is driven from belt roller 82 by sprockets 120 and 121 secured to the respective roller or its shaft and connected by a chain 122. Since the sheet directing roller always engages the top periphery of roller 114, the sheet is always directed horizontally into a pocket by the roller 118.

Indexing means, FIGS. 7 and 8, is connected with the sprocket shaft 77 and includes a ratchet disk 123 having ratchet notches 124 shown on the periphery of the disk. A pawl carrier 125 is oscillatably mounted on the shaft 77 and carries a pawl 126 on a pawl pivot 127 in a position so that the pawl engages a pawl notch and turns the disk for each oscillation of the pawl carrier. A spring 128 presses the pawl into contact with the pawl disk. The pawl carrier is oscillated, such as by a crank 129 carried by a crank shaft 130. The crank is connected by a link 131 on a pivot 132 at one end and the other end of the link is pivotally connected by a pivot 133 carried by the pawl carrier. A non-retract or lock disk 134 is secured to the shaft 77 and has notches 135 in the periphery thereof to be engaged by a lock pawl 136 pivotally mounted on a pin 137 and held against the disk periphery by a spring 137. Means are provided to raise the lock pawl when the crank starts to turn which means includes a cam surface 143 which cam surface is engaged by a roll 144 carried on the crank 129. Starting position is shown in dot-dash lines.

Gears 145, 146, and clutch 149 connect the main shaft 32 with the crank shaft 130 which clutch is of the type which when engaged rotates the shaft and crank for one revolution and then releases so that the one revolution of the crank oscillates the pawl carrier once so that the pawl rides on the periphery of the disk in a clockwise direction of movement of the pawl carrier and then engages a notch 124 so that on the return movement the pawl turns the pawl disk for one notch to turn the shaft 77 and sprockets 75 to move the delivery end of the ramp means to the next pocket. A one revolution clutch is well known. The clutch is engaged by a solenoid 150 under the control of a sheet moving on the ramp means, as will appear hereinafter.

Return operating means is provided for the ramp means to move the delivery end, upon termination of the step-by-step movement, in the return direction, or upwardly in the construction shown, to initial position to again feed a sheet into each of the pockets. This return operating means FIG. 8, includes a sprocket 153 secured to shaft 77, a chain 154, and sprocket 155 freely rotatable on a jack shaft 156 which jack shaft is operatively connected with the main shaft 32 through a friction clutch, 160, sprocket 157, chain 158, and a sprocket 159 secured to the main shaft 32, so that upon engagement of this clutch, sprocket shaft 77 is rotated in a reverse direction. The friction clutch includes a driving clutch plate 161 secured to the shaft 156 and a driven clutch plate 162 secured to sprocket 155 and freely movable on shaft 156. The friction clutch is engaged when the ramp means reaches one of its limits or particularly either a lower limit or the maximum lower limit, and is disengaged when the ramp means reaches its other limit of movement.

The friction clutch is operated to engaged position by suitable means, that particularly shown including a solenoid 165. Energization of this solenoid pulls a clutch operator 166 to the right through a spring 167. Clutch operator 166 is connected by and mounted on a pin 168 on a clutch lever 169 which is pivotally mounted on pivot 170 carried by the frame. A square or cam 171 is turned by the lever 169. The cam lies between a thrust bearing 172 fixed to the shaft 156 and a thrust bearing 173 slidable on the shaft to press driven clutch plate 162 into driving contact with driving clutch plate 161 and thereby rotate sprockets 155, 153, and sprocket shaft 77 in a reverse direction from that of indexing to return the ramp means to initial position.

Pawl lifting means, FIG. 7, are provided to raise the pawl when the ramp means is returned to initial position. This means includes a pawl lift lever 176 mounted on a pivot 177 which lever carries an arcuate lift ear 178 located adjacent to the pawl to engage a lift pin 181 carried thereby. A solenoid 179 is operatively connected with the lever by a pin 180. When the solenoid is energized, the lifting ear moves downwardly and engages the lifting pin 181 to project the pawl downwardly against tension of the spring 128 out of contact with the pawl disc 123 so that the disc may rotate clockwise upon return movement of the ramp means.

Ramp switch means are provided on the frame to halt the ramp means at its two limits of movement which, however, are safety limit switches when a programmer is provided. The ramp limit switch means includes an upper switch 184, FIG. 6, and a lower switch 185 both carried by the frame which is engaged by ramp means structure such as a limit switch pin 186 carried by the ramp side bar 64. If a programmer is not provided, then preferably at least one limit switch is adjustable such as the lower switch upwardly, so that for a book of less than 50 sheets, the ramp means need not travel the full available vertical movement. If both switches are adjustable vertically, then any set of pockets are available. Switch 184 is connected with solenoid 165 to engage the friction clutch 161, 162, and switch 185 breaks the circuit to this solenoid.

Indexing switch means, FIG. 6, are provided to control the indexing or step operating means which includes a sheet triggered switch 188 having its operating lever 189 in the path of each sheet moving along the ramp means. This switch is carried on a bracket 190 secured to a cross member 103 on the delivery section 62 of the ramp means. The switch is spaced from the delivery end of the ramp means to give the ramp time to move to the next pocket after the switch is operated. The leading edge of the sheet preferably operates the switch which avoids the need to adjust the position of the switch as would be necessary for a trailing edge operation for different lengths of sheets. The switch is electrically connected with the solenoid 150, FIG. 8.

Safety means are provided to stop the movement of the ramp means in the event that a sheet has not sufficiently entered a pocket. This means includes a safety switch 193, FIG. 11, having an operating lever 194 carried by the ramp means centrally thereof and particularly shown as carried by a carriage cross bar 196. This switch operating lever moves with the ramp means adjacent to the pockets. A slot 195 is provided in the entry end of each pocket for a longer switch operating lever if the sorter has a single stack of pockets. If a sheet projects just a short distance from its pocket, the lever usually will push it completely into the pocket. If, however, a sheet is jammed, the lever operates the safety switch and stops the operation of the sorter. With this safety control, the machine may also be stopped in the event that a sheet coming off of the ramp means fails to enter its entry slot in its pocket whereupon the sheet will fold upon itself and engage the lever of the safety switch to operate the switch and stop the sorter. Later this safety switch was mounted on stationary roller shaft 117 since usually a sheet buckles upwardly if it does not enter the pocket slot.

Since the ramp means is at different angles at the entry end, it is desirable to have an entry pressure roller means including rollers 197 and 198, FIG. 13, which are rotatably mounted on rods 200 and 264 respectively roller 200 movable over the surface of the belts 80 passing over roller 81 and roller 198 moving to and over roller 81. Rod 200 is carried by links 201 pivotally mounted on a pivot 212 carried by the ramp side members 65. The entry pressure roller rod 200 has a link 203 on each end thereof receiving the end of the rod 204 and 200 hence movable with pull rod 202. The ends of rod 204 are received in a slot 204a carried by frame plates 20a. A spring 201a pulls the links 201 and roller 197 downwardly.

It is desirable to be able to remove one or more sheets at the entry end of the ramp means to examine the printing on the sheet. A proof deflector or gage 208, FIG. 13, is pivotally mounted on a rod 209 to tilt into the path of a sheet and direct it between feed rollers 210, and 211 mounted on shafts 212 and 213 respectively and deposit the sheet in a proof tray 214 where it can be picked up and examined. The roller 210 is driven by a sprocket and chain connection 215 from shaft 216 of a conveyor 255.

At times, it is desirable that one or more sheets be not inserted in a pocket and hence the sheet is deflected after it has triggered the step-by-step control switch 188. It is for this reason that the belt roll 82, FIGS. 6, 6A, is spaced from the delivery roll 114. A rear deflector 218 is pivotally mounted on a pivot 219 so that it can be raised into the path of a sheet and deflect a sheet between roller 82 and a guide 220, between the belt and roller 221 into a tray 222. The rear deflector is moved to deflecting position by a solenoid 223 through lever 224, and link 225.

Preferably, power means are provided to shift the stacks of a two stack unit to and from loading position. A power take-off is provided from shaft 156 through gears 226, 227, 228, 229, to shaft 33. A one revolution clutch 230 which is generally indicated since they are well known, to drive connects the gear 229 with the sprockets 37 and 26 providing a 1 to 2 ratio so that the crank 25 is rotated 180 degrees for each revolution of sprocket 37. A solenoid 231 engages the one revolution clutch which is energized at will or automatically by a switch 232, FIG. 17, as will be described.

A suitable programmer is provided for control of the operation of the sorter. The programmer shown includes a rotary control disc 235, FIG. 2A, having a control pin 236 for each pocket in one stack. Each pin is of that known type which when pressed inwardly, stays in until it is pulled outwardly. The disc is driven by a gear 237 and a pinion 238 which is suitably connected by sprockets and chains 239 with the lower sprocket shaft 77 for the ramp means so that the control disc makes a step-by-step partial revolution equal to the space between pins 236 or about a full revolution for each full step-by-step or downward cycle. A skip switch 241 is located to be operated by any control pin which has been pushed down to operative position and when it reaches control position for its particular pocket. Closing of this switch energizes solenoid 239 to shift the rear or skip deflector 218 into the path of a sheet and deflect it to tray 222.

The programmer also includes a series of holes 242 at a different radius, one for each pocket. A switch operator or pin 243 is provided for one of the holes and preferably it is mounted on an arm 244 which is freely turnable on the shaft 240 for selection of any hole 242. The switch operator 243 is pulled outwardly whereupon it may be shifted to any other hole 242 where it will engage count switch 246 first and then limit switch 247 secondly which is a down limit switch for the ramp means. With this limit switch on the programmer, limit switch 185 on the frame serves as a safety switch in the event the operator fails to insert switch operator 243 in a hole where it can operate the programmer limit switch 247.

The programmer also includes a third set of holes 249, one for each pocket into which a switch operator or pin 250 may be inserted. This switch operator, preferably also, is carried by an arm 251 freely turnable on the shaft 240. This switch operator is pulled out of its hole whereupon it may be shifted to another of this series of holes. When the switch operator is in a hole, it will engage and operate up limit switch 252. This switch operator also serves for zoning for example, for a twenty page book pockets 1 to 20 may be used for one page and then pockets 25 to 50 may be used for a second page so that the pocket stack is zoned in any desired arrangement.

Since the press structure and the sorter are shown as separate units, a belt conveyor 255 is provided to receive a sheet from the press and deliver it to the sorter. It is convenient to have the conveyor driven by a separate motor 255 connected with shaft 216 by belt 257 and suitable pulleys.

The circuit is illustrated in FIG. 17 and includes manual power switches 260 for connecting the circuit with the power lines. Closing of the switches 260 energizes the conveyor motor 265 and drives the belt conveyor 255.

The sorter is started by closing a manual starter switch 261 which energizes relay A and closes its contacts A1 and A2 to energize main circuit wires 262. A holding circuit is provided by a wire 263 and a normally closed stop switch 264 which is connected with the relay A to hold the latter energized. Opening of stop switch 264 stops the sorter motor by deenergizing relay A which opens contacts A1 and A2. The wires 262 are connected with the sorter motor so that the main shaft 32 is driven and the endless belt means 80 of the ramp means are in operation. Energization of the wires 262 also closes a circuit through wire 267, the bottom limit switch 185 on the frame, limit switch 247 of the programmer and relay B. Relay B operates to close contacts B1 and B3, and open contacts B2, the purposes of which will appear hereinafter. If one or more proof sheets are wanted for deposit in the proof tray 214, in order to learn whether or not the printing is satisfactory, the press is operated to deposit one or more sheets on the conveyor 255 and since the proof deflector solenoid 207 is not energized, the proof deflector is held in its raised position by spring 206 to deliver the printed sheets into the proof tray.

If the proofs are satisfactory, the press is again operated to print, the manual switch 270 is closed which closes a circuit including wire 269, switch 270 which energizes solenoid 207 to pull the proof deflector 208 down. Relay C closes contacts C1 to close a hold circuit including wire 271, now closed contacts B1, normally closed switches 246 and 272, wire 273, through contacts C1 and relay C. The switch 272 may be opened to open the hold circuit for relay C which deenergizes solenoid 207. In order to assure that the proof deflector 208 is not raised while a sheet is passing over the same to the ramp means, a proof finger switch 205 is provided having a finger 205a projecting into the path of the sheet to be closed thereby and maintain a second holding circuit through contacts C1 and relay C until the sheet has passed. Opening of count switch 246 by the control disc 235 at the end of a run breaks the circuit.

The sheets are now delivered one at a time in spaced relation to the ramp means and travel to the delivery end thereof. In this passage of a sheet, an indexing circuit is energized through wire 276, through normally closed contacts D1, switch 277, sheet triggered switch 188 on the ramp means, normally closed relay contacts E1, wire 178, now closed contacts B3, wire 279 and indexing solenoid 150. The solenoid releases the one revolution clutch 149 to turn the crank 129 through one revolution to index the delivery end of the ramp means to the first pocket and the sheet is delivered therein. The second sheet goes through the same cycle and the sheet is delivered into the second pocket and so on.

The downward movement of the ramp means also turns the control disk 236 of the programmer in a clockwise direction and turns the arm 244 therewith. Depending upon the hole 242 in which the switch operator 243 is inserted, which is dependent upon the number of pockets to receive a sheet, the lever is turned until it reaches switch 246, two sheets before the end of the indexing, to break the circuit 271 and deenergize proof relay C and open the relay holding circuit contacts C1. This deenergizes proof deflector solenoid 207 and spring 206 opens the proof deflector 208 so that no more sheets are fed to the ramp means. Since the sheets are closely spaced from the press, there are two sheets on the ramp means, and the indexing circuit must be maintained until the ramp means is indexed two more times and these two sheets are inserted in their respective pockets. Indexing continues until switch operator 243 opens limit switch 247 and relay B is deenergized. A delay circuit is provided including wire 282 now closed contacts B2, a hold switch 283, and a relay F. Relay F is a time delay device, that is, it may be a delay relay or it may be a motor driven timer, both of which are known, which delays closing of the contacts F1 for a period long enough to complete the delivery of the last sheet from the ramp means. The delay is a matter of about ½ second. The relay contacts F1 are in a shunt circuit including wire 284, the contacts F1, and relay D to delay energizing of this relay and hence retain the contacts D1 closed in the indexing circuit 276 to complete the delivery. Upon termination of the delay period, contacts F1 close and relay D is energized which closes a holding circuit through contacts D1. Contacts D1 and D4 are opened to break the indexing circuit through switch 188. Contacts D3 are closed to energize the return operating means solenoid 231 and pawl lift solenoid 179 to return the ramp means to its other, or up, position whereupon limit switch 252 opens to deenergize relay D and halt the ramp means at its up position either top position or below top position depending upon the location of limit switch operator 250.

It is desirable to provide a non-repeat circuit for the sheet trigger switch 188 in the event that a sheet should be stuck underneath the same which would otherwise repeat the indexing. A non-repeat circuit includes a wire 286 connected behind the trigger switch, a non-repeat switch 287, FIG. 7, which is located to be engaged and closed by the crank link 131 about the time that the indexing is half completed. Closing of switch 287 energizes relay E so that contacts E1 in the trigger circuit open and contacts E2 close to provide a shunt hold circuit around switch 287 to maintain relay E energized. It remains energized until trigger switch 188 opens whereupon relay E is deenergized to restore the indexing circuit 276 to operative condition.

Switches 277 and 283 are switches which are manually opened and are used, if it is desired, to put more than one sheet into one pocket. These switches hold out the indexing circuit until the desired number or sheets have been deposited in one pocket whereupon closing of these switches restores the indexing circuit to operative condition and indexing of the ramp means continues.

If the operator should fail to put the switch actuator 243 into a hole, the down limit switch 247 will not be opened. If this should occur, then when the ramp means reaches its bottom position, the ramp limit switch 185 on the frame is opened to halt movement of the ramp means. It is clear, however, that without the programmer, the downward movement of the ramp means could just as well be achieved by adjusting the position of the switch 185 on the frame in the event all of the pockets are not to receive a sheet or remain at the bottom in the event that all pockets are to receive a sheet. In the circuit illustrated with a programmer, the limit switch 185 is fixed and serves as a safety switch. Similarly, if a programmer is not provided, the upper switch may be adjustable for zoning, that is, a first page of a twenty page book may be inserted in pockets 1 to 20 with the lower limit switch so positioned and a second page inserted in pockets 25 to 45 with the upper limit switch so positioned to halt raising of the ramp means at pocket 25.

The ramp means may be returned to its initial position such as top position by manually closing switch 290 to close the return circuit including wire 289, top limit switch 184, the disk controlled limit switch 252, switch 290, and relay D. This is used generally only when sheets are not being handled for testing operation or if an automatic return is not provided. Energization of the relay D closes holding circuit contacts D2 so that relay D1 remains energized until up limit switch 252 is opened as described, which deenergizes relay D to restore the contacts D1, D2, D3, and D4 to their initial condition.

At times, it is desired that a sheet not be delivered to one or more pockets. A skip circuit is therefore provided which is controlled from the skip control pins 236. If a pocket is not to receive a sheet, the skip control pin 236 for that pocket on the disk 235 is depressed which is releasably held depressed, so that as the control disk 235 rotates, the pin opens the skip switch 241 which is connected with wire 286 through wire 293, skip switch 241, and relay G. Energization of this relay closes a shunt holding circuit including contacts G1 as well as energizing solenoid 223 which operates the skip or upper deflector 218, FIG. 6, into the path of a sheet and the sheet is delivered into the tray 222. Although the sheet is not delivered into a pocket, it has nevertheless tripped the sheet trigger switch 188 so that the ramp means is indexed to the next pocket for another indexing by the sheet following. Opening of the switch 241 when the disk moves to its next position deenergizes relay G and its holding circuit contacts G1 to restore the skip deflector 218 to down position by its spring 217.

With a single stack of pockets, the plate is changed on the press and the plate for page 2 is put on the press and the sorting repeated for this page and so on. With a multiple stack as illustrated, the second stack may be moved manually into delivery position and the process repeated for this stack for each page. When both stacks have received their sheets, the first stack is then moved to sheet receiving position, the plate changed on the press, and the process is repeated.

It is desirable to shift the multiple stack by power which is accomplished by a stack circuit including a wire 295, switch 232a, solenoid 231 which engages a one revolution clutch 230 and rotates crank 25 through 180 degrees to shift the stack. Switch 232 has a center position in which the switches 232a and 232b are not closed. Manually closing of the switch 232a is spring opened so that upon release, this switch opens. The shifting of the stack, however, is completed because of the one revolution clutch 230.

If it is desired to have the stack shift automatically, switch 232 is operated so that switch 232b is closed. The switch is constructed to remain in this position and such switches are well known. Switch 232b is connected in a circuit including wire 267, contacts 296a or 296b, a wire 296 which connects a second contact of switches 185 and 247 so that when one of these limit switches is opened, usually switch 247 on the disk 135, the circuit is closed through the stack solenoid 231 which engages the one revolution clutch 230, FIG. 8, and the stack is automatically shifted to its other position. At the beginning of the upward movement of the ramp means, the switch 247 is released from contacts 247b and switch 247 returns to its normally closed position so that the circuit 276 is ready for indexing into the second stack. At the bottom position of the ramp means for the second stack, the operation repeats to restore the first stack into sheet receiving position. It will be noted that the stack means is shifted automatically solely from the bottom limit switches and not from the upper position of the stack means since it is not necessary to do so in view of the fact that the plate on the press must now be changed when the first stack is restored to delivery position.

This invention is presented to fill a need for improvements in a sheet sorter having pivoted ramp. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A sheet sorter comprising a frame, a drive shaft rotatably mounted on the frame, a plurality of pockets disposed one above the other and adjacent to or carried by the frame, ramp means having an entry end and a delivery end, the delivery end being adjacent to the pockets, endless means extending between the ends of the ramp means to feed sheets thereon from the entry end to the delivery end including directing means at the delivery end to direct each sheet into its pocket; pivot means carried by the frame and pivotally mounting the entry end of the ramp means at a point spaced from the pockets, and the delivery end of the ramp means being adjacent to the ends of the pockets as the ramp means pivots; ramp operating mechanism operatively connected between the drive shaft and the ramp means including step by step indexing means moving the ramp means in one direction a distance corresponding with the pocket spacing, return operating means operatively connected between the drive shaft and the ramp means to move the latter in the opposite direction; trigger means carried by the ramp means and connected with the indexing means to initiate its operation including a trigger in the plane of the endless means to be engaged by a sheet moving thereon; and limit control means operable by the movement of the ramp means at the ends of its downward and upward movement to halt the ramp means including a first limit control connected with the indexing means to discontinue its operation, a second limit control connected with the return operating means to discontinue its operation, and means to initiate operation of the return operating means.

2. A sorter as in claim 1 in which the pockets are positioned in vertical alignment, the ramp means including an entry section and a delivery section, means operatively connecting the two sections together for extension and contraction of the ramp means, and means to retain the delivery end of the delivery section adjacent to the pockets as the ramp means pivots.

3. A sorter as in claim 2 in which the return operating means includes a clutch and the means to initiate operation of the return operating means is means engaging the clutch automatically upon the ramp means reaching the limit of its indexing operation.

4. A sorter as in claim 2 in which the directing means includes a delivery roller at the delivery end of the ramp means, and a directional roll rotatably carried by the delivery end of the ramp means and engaging the delivery roller and at the top periphery thereof in all positions of the ramp means.

5. A sorter as in claim 2 including vertical track means carried by the frame, and carriage means pivotally connected with the delivery section of the ramp means and engaging the track means to extend and contract the ramp means.

6. A sorter as in claim 5 in which the track means is adjacent to the pockets, and in which the carriage means is pivotally connected on the delivery end of the delivery section of the ramp means.

7. A sorter as in claim 1 including a delivery roller at the delivery end of the ramp means, the endless means including a roller carried by the delivery section and spaced from the delivery roller, a skip deflector mounted between the delivery roller and said endless means roller and having a deflecting position in the path of a sheet and an inactive position, and skip control means connected with the skip deflector to move the same to and from deflecting position.

8. A sorter as in claim 1 including a proof deflector at the entry end of the ramp means movable to and away from deflecting position, and proof deflector operating means connected with the proof deflector to direct a sheet away from the ramp means.

9. A sorter as in claim 8 in which the proof deflector operating means includes spring means to hold the proof deflector in deflecting position, a solenoid connected with the proof deflector, and switch means connected with the solenoid to energize the same.

10. A sorter as in claim 9 in which the switch means for the proof deflector includes in series a manually operated starter switch, and a proof circuit relay having contacts; and a first hold circuit shunting the starter switch including a count switch and the proof relay contacts, and a second holding circuit shunting the count switch including a proof finger switch having a finger located after the proof deflector and in the path of a sheet passing to the ramp means to close the switch by a sheet passing over the proof deflector to the ramp means.

11. A sorter as in claim 7 including a proof deflector at the entry end of the ramp means movable to and away from deflecting position, and proof deflector operating means connected with the proof to direct a sheet away from the ramp means.

12. A sorter as in claim 7 including a programmer connected with the ramp means and driven thereby, a skip solenoid connected with the skip deflector, in which the skip control means includes a skip switch connected with the skip solenoid and located at the programmer, the programmer having a socket for each pocket, and a switch operator for one or more of the sockets.

13. A sorter as in claim 2 in which the indexing means includes a pawl disk having notches, a pawl carrier mounted for oscillation, a pawl carried by the pawl carrier and positioned to engage the notches on the pawl disk, a crank rotatably mounted on the frame, a one revolution indexing clutch connected between the drive shaft and the crank, and means operated by the control trigger means to engage the indexing clutch.

14. A sorter as in claim 1 including a programmer connected with the ramp means and driven therewith, in which the first limit control is a switch located adjacent to the programmer, and a first limit switch operator carried by the programmer and adjustable thereon and located to engage the first limit switch in the movement of the programmer.

15. A sorter as in claim 14 in which the second limit control is a second limit switch located adjacent to the programmer and including a second limit switch operator carried by the programmer and adjustable thereon and located to engage the second limit switch upon movement of the programmer.

16. A sorter as in claim 15 including a lower frame limit switch carried by the frame to be engaged by the ramp means at its lower limit of movement and connected in series with the programmer limit switch, and an upper frame limit switch carried by frame and located to be engaged by the ramp means at its upper limit of movement and connected in series with the second limit switch.

17. A sorter as in claim 1 including a normally closed safety switch carried by the ramp means on the delivery end thereof and adjacent to the pockets, a motor control circuit controlling operation of a motor including a normally open motor starting switch and a normally closed motor stop switch in parallel therewith, and the safety switch being connected in series with the motor stop switch.

18. A sorter as in claim 1 in which the endless means includes an entry belt roller at the entry end of the ramp means, and entry pressure means cooperating with the entry roller including link means pivotally mounted at one end thereof on the ramp means adjacent to the entry roller, the link means including a rod mounted on the link means at the other end thereof, pressure roller means rotatably mounted on the rod and engaging the belts on the entry roller and movable around this roller as the ramp means pivots, and spring means connected with the link means to press the pressure roller against the endless means.

19. A sorter as in claim 18 including a second link means pivotally mounted at one end on the pressure roller rod, a second entry pressure roller mounted on the other end of the second link means, and means guiding the second entry pressure means to and from the entry belt roller.

20. A sorter as in claim 2 in which the ramp means includes pressure means along the endless means, the pressure means comprising a plurality of ball cages, a ball carried by each cage and engaging the endless means, at least one cage rod means along the endless means and extending longitudinally therewith, and spring means on the cage rods between the cages to maintain the cages equally spaced, as the ramp means extends and contracts.

21. A sorter as in claim 13 in which the control trigger means includes an indexing circuit comprising a trigger switch operated by the trigger and an indexing solenoid operatively connected with the one revolution clutch of the indexing means, a non-repeat circuit connected between the trigger switch and the indexing solenoid including a non-repeat switch and a non-repeat relay, and a holding circuit shunting the non-repeat switch and closed by the non-repeat relay, and the non-repeat switch being closed by the crank in its movement.

22. A sorter as in claim 21 including a normally closed manual multiple sheet switch connected in series in the trigger index circuit.

23. A sorter as in claim 21 including a delivery roller at the delivery end of the ramp means, the endless means including a roller carried by the delivery section and spaced from the delivery roller, a skip deflector mounted between the delivery roller and said endless means roller and having a deflecting position in the path of a sheet and an inactive position, a skip solenoid connected with the skip deflector, a programmer connected with the ramp means and driven therewith, a skip solenoid connected with the skip deflector; and a skip control circuit including a skip switch connected with the skip solenoid and located at the programmer, the programmer having a socket for each pocket, a switch operator for one or more sockets, and the skip control circuit being connected between the trigger switch and the indexing solenoid.

24. A sorter as in claim 23 including a hold circuit for the skip circuit shunting the skip switch.

25. A sorter as in claim 14 in which the stack means comprises a pair of adjacent stacks, means mounting the stack means for shifting of the stacks to and from delivery position, stack operating means connected with the stack means to shift the same, stack control means including a solenoid connected with the stack operating means to initiate operation thereof and a stack control switch connected with said solenoid, and the first limit switch and the stack control switch being operatively connected together to close one switch on opening of the other.

26. A sorter as in claim 25 including a selector switch connected between the stack control switch and the stack control solenoid having two positions switch elements one for manual control and the other being retained in closed position for automatic shifting of the stack means.

27. A sorter as in claim 13 including a proof deflector at the entry end of the ramp means, spring means propelling the proof deflector to deflecting position, a proof solenoid connected with the proof deflector, a proof circuit including in series a starter switch and a proof relay, and a hold circuit shunting the starter switch having in series a proof circuit contactor, a normally closed count switch opened by the ramp means before indexing is completed, and a holding circuit contactor connected with the proof circuit relay and closed thereby; in which the means to engage the indexing clutch is a solenoid, and an indexing switch operatively connected with the control trigger to be closed thereby and connected with the indexing clutch solenoid; in which the return operating means includes a return clutch, a return circuit including a return clutch solenoid operatively connected with the return clutch to engage the same, and a return contactor connected in series with the return solenoid; in which the first limit control includes a normally closed first limit switch opened by the ramp means at the end of the indexing operation and a first limit circuit relay in series therewith; in which the second limit control comprises a return circuit including in series a return limit switch opened by the ramp means upon its return to initial position, a normally open return switch, and a return circuit relay, and a holding contactor shunting the return switch and closed by the return limit circuit relay; the return limit circuit relay being operatively connected with the return circuit contactor to close the same.

28. A sorter as in claim 27 including a normally closed contactor in the indexing circuit ahead of the trigger switch and operatively connected with the return limit circuit relay to be opened thereby.

29. A sorter as in claim 28 including a normally open contactor in the indexing circuit between the trigger switch and the indexing solenoid and operatively connected with the first limit circuit relay to close the same.

30. A sorter as in claim 27 including a pawl lifting means, a pawl lift solenoid operatively connected with the pawl lift means, and the solenoid being connected in parallel with the return clutch solenoid.

References Cited

UNITED STATES PATENTS

| | | | |
|---|---|---|---|
| 2,076,391 | 4/1937 | Whitehead | 271—64 |
| 3,273,882 | 9/1966 | Pearson | 270—58 |

EUGENE R. CAPOZIO, *Primary Examiner.*

P. WILLIAMS, *Assistant Examiner.*